United States Patent
Jun

(10) Patent No.: US 7,961,798 B2
(45) Date of Patent: Jun. 14, 2011

(54) MODULATION AND DEMODULATION APPARATUSES AND METHODS FOR WIRED/WIRELESS COMMUNICATION SYSTEM

(75) Inventor: Yong Il Jun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 457 days.

(21) Appl. No.: 11/989,620

(22) PCT Filed: Nov. 30, 2006

(86) PCT No.: PCT/KR2006/005140
§ 371 (c)(1),
(2), (4) Date: Jan. 28, 2008

(87) PCT Pub. No.: WO2007/064165
PCT Pub. Date: Jun. 7, 2007

(65) Prior Publication Data
US 2009/0175365 A1    Jul. 9, 2009

(30) Foreign Application Priority Data
Dec. 1, 2005 (KR) .................. 10-2005-0116582

(51) Int. Cl.
*H04K 1/10* (2006.01)
*H04L 27/28* (2006.01)

(52) U.S. Cl. ........ 375/260; 375/340; 375/289; 375/312; 370/499; 398/98; 398/76; 398/172; 398/77

(58) Field of Classification Search .................. 375/260, 375/340, 289, 312; 370/499; 398/98, 76, 398/172, 77
See application file for complete search history.

(56) References Cited

U.S. PATENT DOCUMENTS
5,754,322 A * 5/1998 Ishikawa et al. ................ 398/98
(Continued)

FOREIGN PATENT DOCUMENTS
| EP | 0 788 264 A2 | 6/1997 |
|---|---|---|
| KR | 1020050089709 A | 8/2005 |
| WO | WO 03/041330 A2 | 5/2003 |

OTHER PUBLICATIONS

Lowery, A., "10 Gbit/s multimode fiber link usingpower efficient orthogonal-frequency-division multiplexing", 2005, Optics Express, vol. 13, 10003-10009.*

(Continued)

*Primary Examiner* — Shuwang Liu
*Assistant Examiner* — Sung Ahn
(74) *Attorney, Agent, or Firm* — Blakely, Sokoloff, Taylor & Zafman LLP

(57) ABSTRACT

Wired/wireless optical signal modulation and demodulation apparatuses and methods using an intensity modulation/direct detection method and an orthogonal frequency division multiplexing (OFDM) method are provided. A unipolar OFDM symbol frame is generated by determining the polarity of each of a plurality of sub-frames of a bipolar OFDM symbol frame which comprises both a plurality of positive pulses and a plurality of negative pulses, inverting the polarity of the sub-frames which are determined to be negative, delaying one of the positive sub-frame and a positive sub-frame obtained through the inversion by the duration of the sub-frames, and multiplexing the result of the delaying and whichever of the positive sub-frame and the positive sub-frame obtained through the inversion is not the result of the delaying. The unipolar OFDM symbol frame can guarantee high power amplification efficiency and high transmission power efficiency, and is robust against a multi-path channel environment. Therefore, the unipolar OFDM symbol frame can be used in various optical signal modulation/demodulation methods for wireless indoor broadband optical transmission devices, wired broadband optical transmission devices using multi-mode optical fibers, and radio-over-fiber devices which transmit baseband analog signals as optical signals.

12 Claims, 11 Drawing Sheets

U.S. PATENT DOCUMENTS

| | | | |
|---|---|---|---|
| 6,442,211 B1 * | 8/2002 | Hampel et al. | 375/260 |
| 6,470,030 B1 | 10/2002 | Park et al. | |
| 7,054,375 B2 * | 5/2006 | Kannan et al. | 375/260 |
| 2003/0128751 A1 * | 7/2003 | Vandenameele-Lepla | 375/229 |
| 2004/0018018 A1 * | 1/2004 | Izadpanah | 398/77 |

OTHER PUBLICATIONS

Gonzalez, O., "OFDM over indoor wireless optical channel", 2005, Optoelectron, vol. 152, p. 199-204.*

* cited by examiner

FIG. 1 (PRIOR ART)

AVERAGE POWERS AND AVERAGE BANDWIDTHS REQUIRED BY NRZ-OOK MODULATION METHOD AND OTHER MODULATION METHODS IN IM, AWGN CHANNEL ENVIRONMENT

| Modulation Scheme | Normalized Average Power Requirement (Optical dB) | Normalized Bandwidth Requirements |
|---|---|---|
| OOK, NRZ | 0 | 1 |
| OOK, RZ, duty Cycle $\gamma$ | $5 \log_{10} \gamma$ | $\frac{1}{\gamma}$ |
| N BPSK subcarriers | $1.5 + 5 \log_{10} N$ | 2 |
| N QPSK subcarriers | $1.5 + 5 \log_{10} N$ | 1 |
| L-PPM (soft decisions) | $-5 \log_{10}\left[\frac{L \log_2 L}{2}\right]$ | $\frac{L}{\log_2 L}$ |
| L-PPM (hard decisions) | $-5 \log_{10}\left[\frac{L \log_2 L}{4}\right]$ | $\frac{L}{\log_2 L}$ |
| L-DPPM (hard decisions) | $-5 \log_{10}\left[\frac{L \log_2 L}{8}\right]$ | $\frac{L+1}{2\log_2 L}$ |

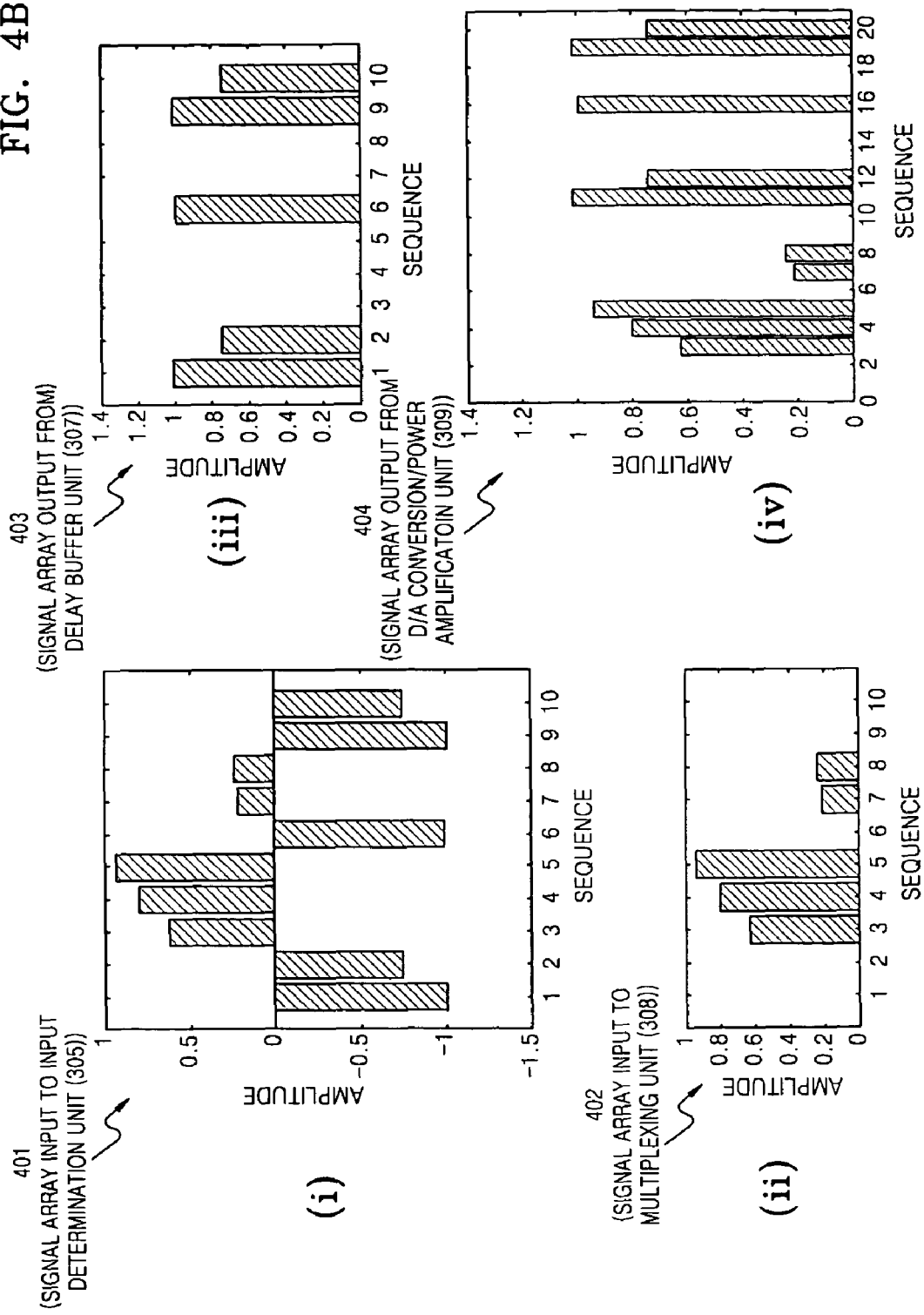

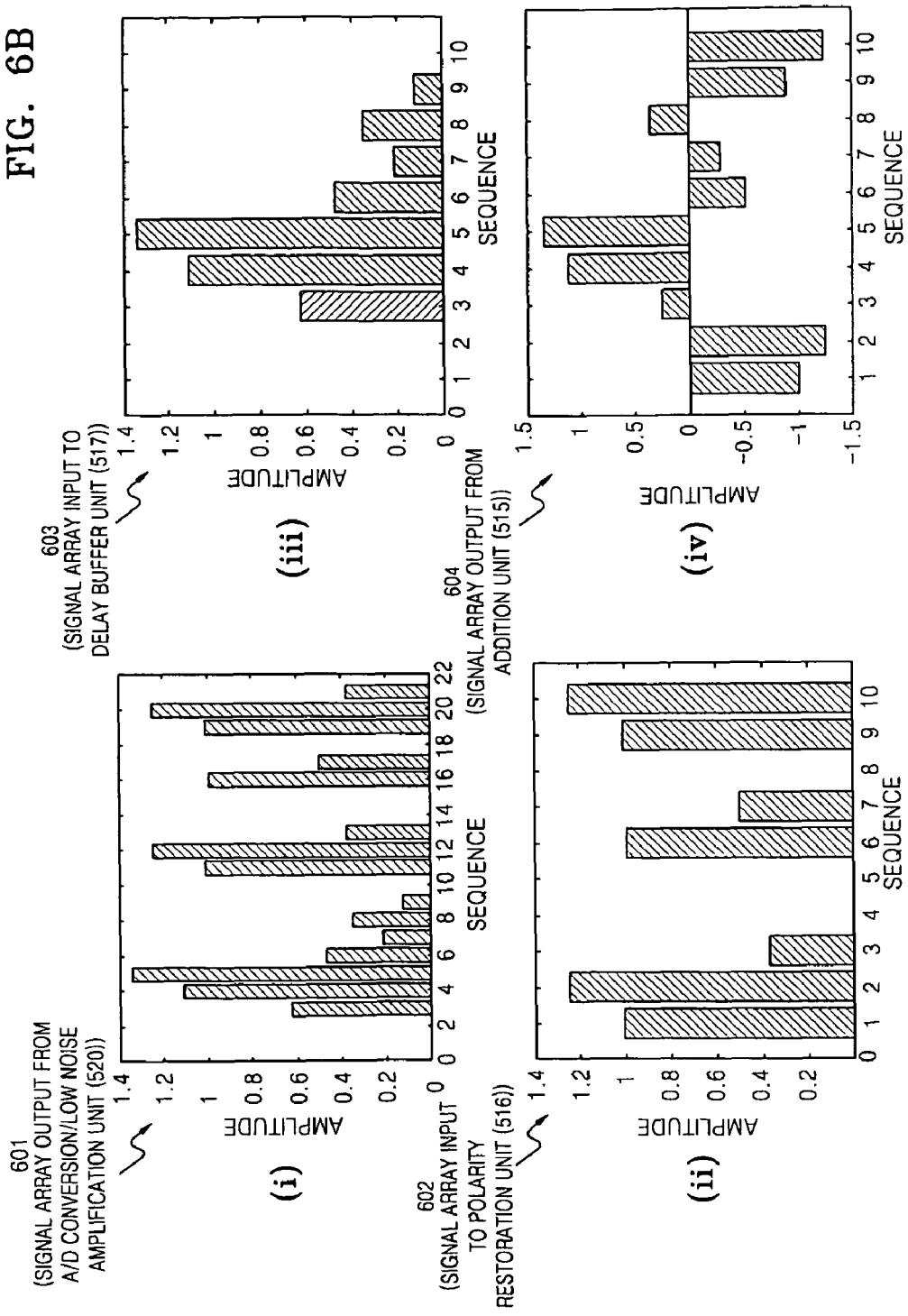

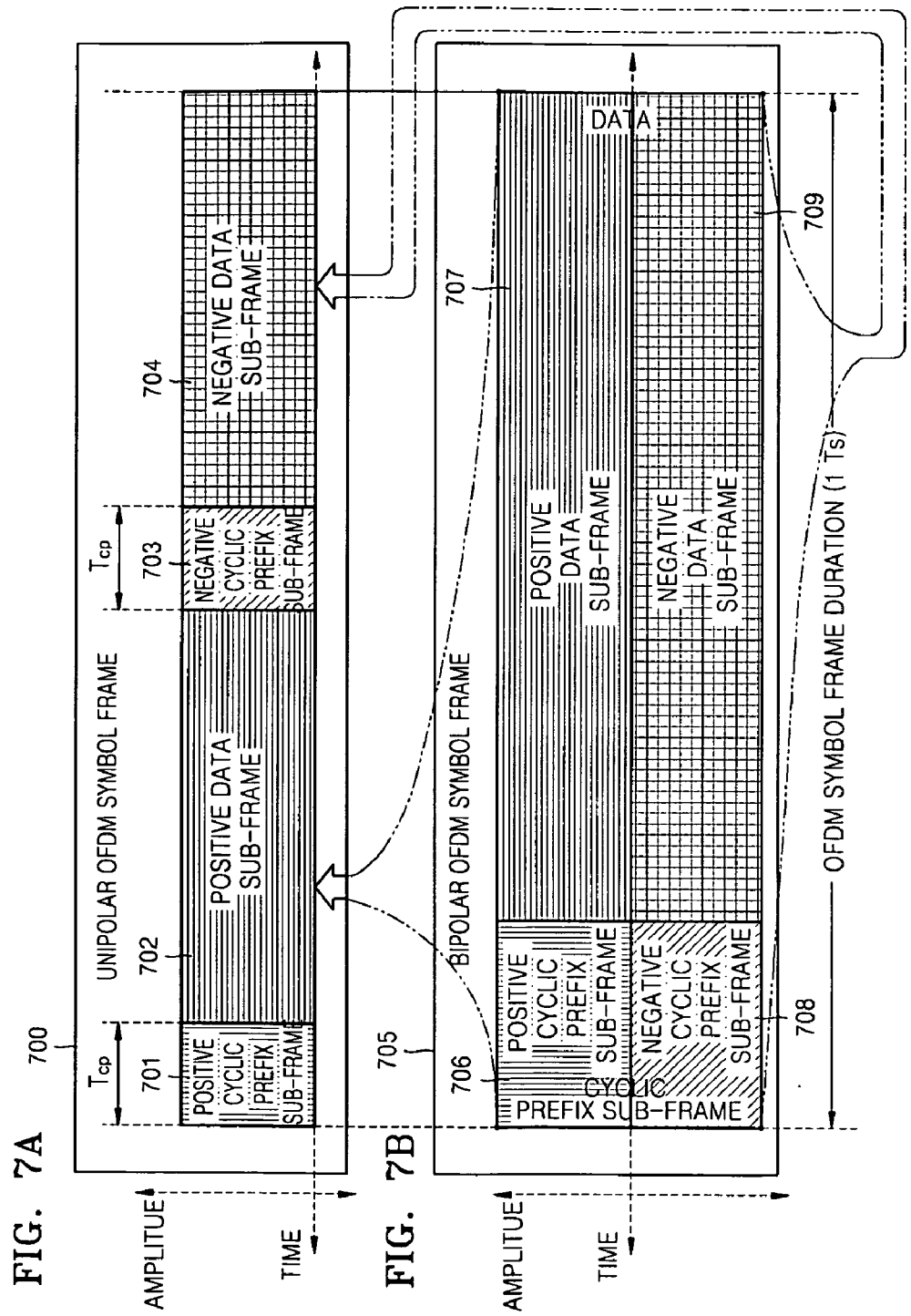

MODULATION AND DEMODULATION APPARATUSES AND METHODS FOR WIRED/WIRELESS COMMUNICATION SYSTEM

The present patent application is a non-provisional of International Application No. PCT/KR2006/005140, filed Nov. 30, 2006.

CROSS-REFERENCE TO RELATED PATENT APPLICATION

This application claims the benefit of Korean Patent Application No. 10-2005-0116582, filed on Dec. 1, 2005, in the Korean Intellectual Property Office, the disclosure of which is incorporated herein in its entirety by reference.

BACKGROUND OF THE INVENTION

1. Field of the Invention

The present invention relates to modulation and demodulation apparatuses and methods which are capable of guaranteeing high transmission power efficiency to wired/wireless optical communication apparatuses with an orthogonal frequency division modulation (OFDM) method and an intensity modulation (IM)/direct detection (DD) method.

2. Description of the Related Art

Traditionally, in optical telecommunications fields, where it is very difficult to realize coherent communication systems, IM/DD methods have been widely used. Drivers, light sources, modulators, light detectors, and preamplifiers for the IM/DD methods have been developed and commercialized, thereby enabling the establishment of highly economical systems.

IM methods may be classified into direct modulation methods and indirect modulation methods. Direct modulation methods in which an optical signal is directly modulated by applying a current signal to a light-emitting diode (LED) or a laser diode (LD), and indirect modulation methods in which an optical signal is indirectly modulated by applying a current signal to an electroabsorption modulator (EAM) that is coupled to an LED or an LD. Due to high performance and high cost-effectiveness, the direct modulation methods have been deemed suitable for optical wireless communication systems. Direct modulation methods may be classified into time division (TD) modulation methods such as a non-return-to-zero (NRZ) or return-to-zero on-off keying (OOK) method or a pulse position modulation (PPM) method in which a transmission signal is modulated in consideration of signal intensity or a period between pulses, and frequency division (FD) modulation methods in which a transmission signal is modulated on one or more sub-carriers.

The OOK method, which can be referred to T. S. Chu and M. J. Gans, "High speed infrared local wireless communication," IEEE Communication Magazine, vol. 25, No. 8, pp. 4-10, August 1987, and the PPM method, which can be referred to D. S. Shiu and J. M. Kahn, "Differential Pulse-Position Modulation for Power-Efficient Optical Communication," IEEE International Conference on Communication, Montreal, Quebec, Canada, Jun. 8-12, 1997, are highly efficient in terms of using optical signal power and are easy to realize. Thus, the OOK method and the PPM method have been authorized as standard PHY optical modulation/demodulation methods by the Infrared Data Association (IrDA).

However, in an indoor environment where multiple paths may exist, TD modulation methods cannot guarantee a communication speed of 10 Mb/s or higher without the aid of signal interference compensation equipment such as equalizers. In order to address this problem, a turbo equalizer-based method, which can be referred to Michael Tuchler, Ralf Koetter, and Andrew C. Singer, "Turbo Equalization: Principles and New Results," IEEE Tran. on Comm., vol. 50, No. 5, pp. 754~767, May 2002, has been developed. The turbo equalizer-based method is a TD modulation-based method of avoiding signal interference without deteriorating the signal-to-noise ratio (SNR) of received signals. However, the turbo equalizer-based method requires a considerable amount of computation, and is difficult and complicated to realize.

The FD modulation method may be classified as a single sub-carrier modulation (SSM) method in which a single sub-carrier is used or a multiple sub-carrier method (MSM) in which a plurality of sub-carriers are used according to the number of sub-carriers used to modulate a transmission signal, which can be referred to J. B. Carruthers and J. M. Kahn, "Multiple-Subcarrier Modulation for Non-Directed Wireless Infrared Communication," IEEE J. Select. Areas in Commun., vol. 14, pp. 538-546, April 1996.

The MSM OFDM method easy to be realized and easily managing frequency spectrum has been widely used for various wired/wireless communication such as xDSL, wireless LANs, and wireless Internet networks, which can be referred to S. B. Weinstein and P. M. Ebert, "Data Transmission by Frequency Division Multiplexing Using the Discrete Fourier Transform," IEEE Trans. Commun. Technol., vol. COM-19, pp. 628-634, October 1971. In OFDM, frequency distance between two adjacent subcarriers is equal to the inverse of the period of an OFDM symbol in time. A variety of sub-carriers modulation methods, such as M-ary amplitude shift keying (ASK), M-ary phase shift keying (PSK), M-ary frequency shift keying (FSK), and M-ary quadrature amplitude shift keying (QAM), can be used in OFDM.

However, the OFDM method is likely to lower the operating efficiency of power amplifiers because the peak-to-average power ratio (PAPR) of output waveforms is extremely high. In addition, the OFDM method is likely to deteriorate the performance of communication because of a high possibility of signal distortion due to non-linearity of power amplifiers.

A direct current (DC) bias needs to be applied to a baseband OFDM signals because of the requirement that an IM input signals must be unipolar. The DC bias levels are determined according to a minimum peak level among an IM input signals.

If the average of an IM input signals is 0, the power of the DC bias is proportional to the average power of IM output signals, and the average power of transmission signals is proportional to the average of the absolute values of the IM input signals.

Therefore, assuming that transmission power efficiency is defined as the ratio of the average power of transmission signals to the average power of IM output signals, the transmission power efficiency is equal to the inverse of the PAPR of the input signals to be intensity-modulated. In other words, according to conventional IM methods, IM output signals with a high PAPR can be interpreted as very low signal transmission power efficiency.

A table of FIG. 1, which is an excerpt from Joseph M. Kahn, and John R. Barry, "Wireless Infrared Communications", IEEE Proceeding, vol. 85, no. 2 pp. 265-298, February 1997, and D. S. Shiu, and J. M. Kahn, "Differential Pulse-Position Modulation for Power-Efficient Optical Communication," IEEE International Conference on Communication, Montreal, Quebec, Canada, Jun. 8-12, 1997, presents the required average powers and bandwidths of the various modulation schemes compare to the NRZ-OOK.

As indicated in FIG. 1, in an additive white Gaussian noise (AWGN) channel environment where no multiple path interference exists, PPM methods, which are a type of time division method, are efficient in terms of average powers required. The amount of power required by a conventional PSK method such as 2-ary PSK (BPSK) or 4-ary PSK (QPSK) where multiple sub-carriers are used is proportional to the number of sub-carriers used therein.

Therefore, MSM and OFDM method using a considerable number of sub-carriers may not be suitable for IM-based optical signal modulation, even though it has excellent multiple path characteristics.

The present invention provides a technique for addressing the problem of high average power in conventional MSM methods.

Conventional techniques for reducing the amount of power required by MSM and OFDM methods are disclosed in R. YOU and J. M. Kahn, "Average Power Reduction Techniques for Multiple-Subcarrier Intensity-Modulated Optical Signals," IEEE Trans. on Communication, vol. 49, no. 12, pp. 2164-2171, December 2001, and Shota Teramoto and Tomoaki Ohtsuki, "Multiple-Subcarrier Optical Communication Systems with Peak Reduction Carriers", IEEE GLOBECOM-2003 Proceeding, pp. 3274-3278, 2003.

These conventional power reduction techniques are identical in that, of a total of N sub-carriers, (N-L) sub-carriers are allocated to information signals, and L sub-carriers are assigned to maximize a minimum peak (a highest negative waveform value) in an OFDM symbol by applying optimization signals, thereby minimizing a DC bias applied during IM, i.e., the average transmission power.

The conventional power reduction techniques may be classified into a method of fixing in advance the locations of L sub-carriers to minimize transmission power and a method of determining the optimum locations of sub-carriers, instead of fixing the locations of the sub-carriers in advance, such that a minimum signal peak in a OFDM symbol can be maximized.

Also, the conventional power reduction techniques may be classified into a method of altering only the phase of signals of the L sub-carriers used to reduce a DC bias and a method of altering both the phase and amplitude, and also, the conventional power reduction techniques may be classified into a fixed bias method in which a fixed DC bias is applied to all OFDM symbols and a time-variable bias method in which the minimum DC bias is applied per each OFDM symbol, and also, conventional OFDM PAPR minimization methods can be classified according to how they optimize waveforms, which can be referred to Seung Hee Han, Jae Hong Lee, "An Overview of Peak-to-Average Power Ratio Reduction Techniques for Multicarrier Transmission", IEEE Wireless Communications, pp. 56-65, April 2005.

In another conventional PAPR reduction method, which is disclosed in Korean Patent Publication No. 2003-0059523 entitled, "Method and Apparatus for PAPR Reduction Using Soft-Clipping Method in OFDM Wireless Communication System," a pre-emphasis circuit whose amplification varies in inverse proportion to the amplitude of an MSM or OFDM signal, thereby repressing a signal waveform peak applied to an output power amplifier. The inverse operation of an operation performed at a transmission end is performed at a reception end.

Of the aforementioned conventional methods, the PAPR reduction method, which uses sub-carriers, needs a block coder which converts a signal array comprised of K signals (where K=N-L) into a signal array comprised of N signals.

However, when N is too large, it is very difficult to realize a large-scale block coder which is capable of operating in real time to minimize PAPR.

The aforementioned all disclosed methods to minimize PAPR still have a problem in that the waste of a DC bias power cannot be completely prevented because of the bipolar features of OFDM signals.

SUMMARY OF THE INVENTION

The present invention provides wired/wireless optical signal modulation and demodulation apparatuses and methods which use an intensity modulation (IM)/direct detection (DD) method and an orthogonal frequency division multiplexing (OFDM) method, and can mitigate a low transmission power efficiency and a high peak-to-average power ratio (PAPR) of conventional OFDM symbols that are intensity-modulated.

According to an aspect of the present invention, there is provided a modulation apparatus of a wired/wireless communication system comprising: an input determination unit which determines the polarity of each pulse on a bipolar OFDM symbol frame and generates positive sub-frame and negative sub-frame according to the determined polarity; a polarity inversion unit which inverts the polarity of inputted sub-frame; a delay buffer unit which delays the sub-frame obtained by the polarity inversion unit or the sub-frame obtained by the input determination unit; a multiplexing unit which multiplexes the delayed sub-frame and the undelayed sub-frame and generates a digital unipolar OFDM symbol frame; a digital-to-analog (D/A) conversion unit which converts an digital unipolar OFDM symbol frame into an analog unipolar OFDM symbol frame; and a power amplification unit which amplifies the analog unipolar OFDM symbol frame.

According to another aspect of the present invention, there is provided a demodulation apparatus of a wired/wireless communication system comprising: a low noise amplification unit which receives and amplifies an analog unipolar OFDM symbol frame comprising a positive sub-frame obtained through polarity inversion and an intrinsically positive sub-frame; an A/D conversion unit which converts the result of the amplification into a digital unipolar OFDM symbol frame; a time-domain equalization unit which equalizes the unipolar OFDM symbol frame; a demultiplexing unit which demultiplexes the time-domain-equalized unipolar OFDM symbol frame into a front OFDM sub-frame and a rear OFDM sub-frame, the duration of the front OFDM sub-frame and the duration of the rear OFDM sub-frame each being half of the duration of the equalized unipolar OFDM symbol frame; a delay buffer unit which delays the front OFDM sub-frame by half of the duration of the time-domain-equalized unipolar OFDM symbol frame; a polarity restoration unit which restores the intrinsic polarity of whichever of the front OFDM sub-frame and the rear OFDM sub-frame has been polarity-inverted; and an addition unit which combines the result of the restoration and whichever of the front OFDM sub-frame and the rear OFDM sub-frame has not been restored in synchronization with each other.

According to another aspect of the present invention, there is provided a unipolar OFDM symbol frame that guarantees a high transmission power efficiency in an intensity modulation, comprising: a first sub-frame which comprises a plurality of positive pulses of a bipolar OFDM symbol frame, wherein the sequence of the positive pulses in the first sub-frame is the same as the sequence of the positive pulses in the bipolar OFDM symbol frame; and a second sub-frame which comprises a plurality of negative pulses of the bipolar OFDM symbol frame that are inverted, wherein the sequence of the negative pulses in the second sub-frame is the same as the sequence of the negative pulses in the bipolar OFDM symbol frame.

BRIEF DESCRIPTION OF THE DRAWINGS

The above and other features and advantages of the present invention will become more apparent by describing in detail exemplary embodiments thereof with reference to the attached drawings in which:

FIG. 1 is a table presenting the average powers and bandwidths required by a non-return-to-zero (NRZ) on-off keying (OOK) method and other modulation methods in an intensity modulation (IM), additive white Gaussian noise (AWGN) channel environment;

FIG. 4B illustrates the values of signals generated the apparatus illustrated in FIG. 4A when converting a bipolar OFDM symbol frame into a unipolar OFDM symbol frame according to an exemplary embodiment of the present invention;

FIG. 6B illustrates the values of signals generated the apparatus illustrated in FIG. 4A when converting a unipolar OFDM symbol frame into a bipolar OFDM symbol frame according to an exemplary embodiment of the present invention;

FIG. 7A is a diagram illustrating the format of a unipolar OFDM symbol frame according to an exemplary embodiment of the present invention;

FIG. 7B is a diagram illustrating the format of a typical bipolar OFDM symbol frame;

DETAILED DESCRIPTION OF THE INVENTION

The present invention will now be described more fully with reference to the accompanying drawings in which exemplary embodiments of the invention are shown.

Figure 2:
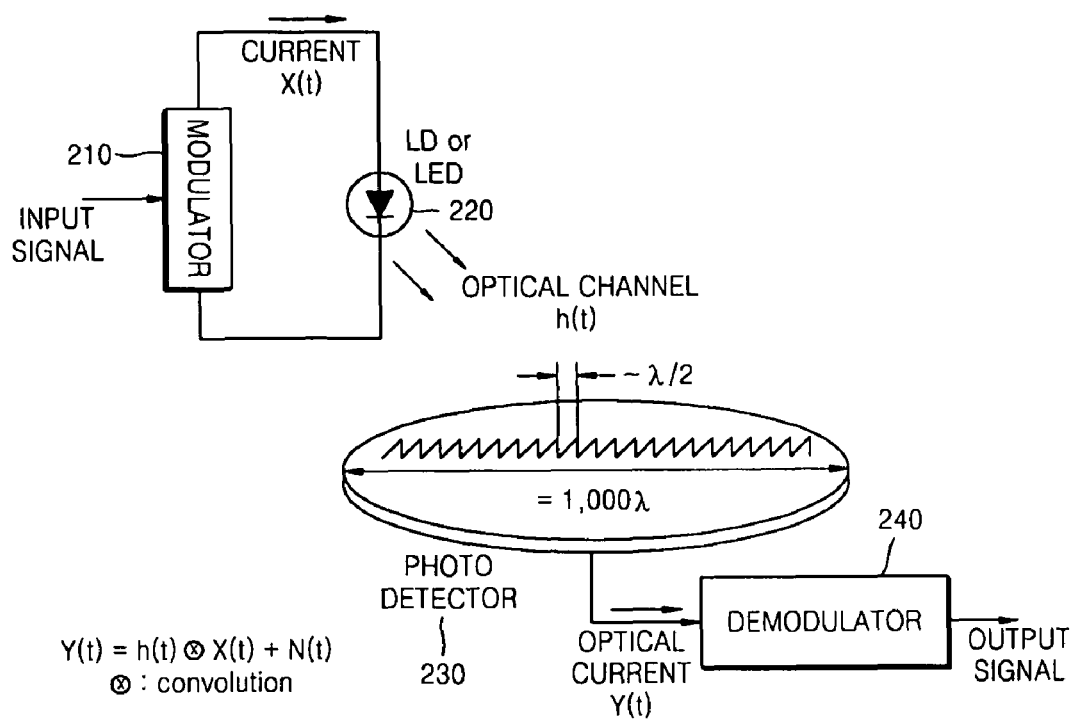
FIG. 2 is a diagram illustrating a conventional IM/DD-based modulation/demodulation method.

FIG. 1 is a table presenting the average powers and bandwidths required by a non-return-to-zero (NRZ) on-off keying (OOK) method and other modulation methods in an intensity modulation (IM), additive white Gaussian noise (AWGN) channel environment. FIG. 1 says that all the known MSM has a poor transmission power efficiency for IM FIG. 2 is a diagram illustrating a conventional IM/DD. Referring to FIG. 2, an input signal includes data to be transmitted, and a modulator 210 converts the input signal into line code which is suitable for a given channel, amplifies the line code to a current suitable for driving a laser diode (LD)/light-emitting diode (LED) 220, and outputs the current.

A received optical signal is converted into an electric signal by a photo detector 230 such as an avalanche photodiode (APD) or a positive-intrinsic-negative diode (PIN diode), and the electric signal is demodulated by a demodulator 240.

Figure 3:
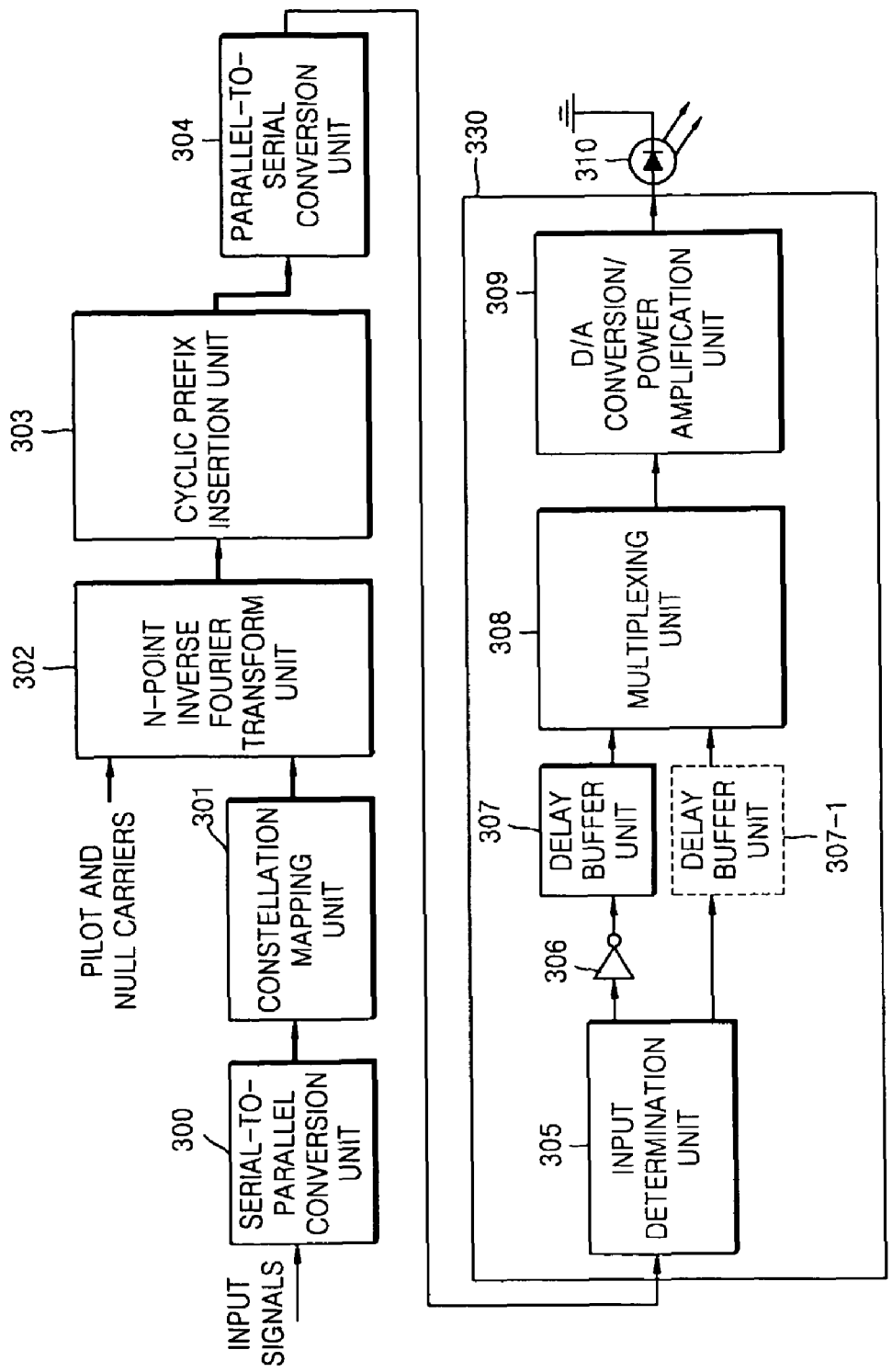
FIG. 3 is a block diagram of a modulation apparatus including an apparatus for converting a bipolar orthogonal frequency division multiplexing (OFDM) symbol frame into a unipolar OFDM symbol frame according to an exemplary embodiment of the present invention.

FIG. 3 is a block diagram of a modulation apparatus including an apparatus 330 for converting a bipolar orthogonal frequency division multiplexing (OFDM) symbol frame into a unipolar OFDM symbol frame according to an exemplary embodiment of the present invention. Referring to FIG. 3, a serial-to-parallel conversion unit 300 converts an L-bit 2-ary signal stream corresponding to an OFDM symbol frame into parallel data.

A constellation mapping unit 301 converts an L-bit 2-ary signal into $L/\log_2^{(M)}$ M-ary signals.

An N-point inverse Fourier transform unit 302 is an inverse Fourier transform unit capable of converting N frequency-domain input signals, including $2*(L/\log_2^{(M)})$M-ary signals, null sub-carrier signals, and pilot sub-carrier signals used to perform frequency band management, noise suppressing, channel estimation, etc., into N time-domain signals. The $2*(L/\log_2^{(M)})$ M-ary signals are complex-valued signals.

To get the real-valued time-domain signals, one half of the complex-valued signals input to the N-point inverse Fourier transform unit 302 must be the conjugated values of the other half of the complex-valued signals. Therefore, N must satisfy the following equation: $N=2*(L/\log_2^{(M)})$+Number of Pilot Sub-carriers+Number of Null Sub-carriers.

A cyclic prefix insertion unit 303 inserts a cyclic prefix into the result of the inverse Fourier transform performed by the N-point inverse Fourier transform unit 302 in order to eliminate inter-symbol interference (ISI) and inter-channel interference (ICI), which may occur due to multi-path channels.

P consecutive signals from the tail of a signal array comprised of a plurality of time-domain signals output by the N-point inverse Fourier transform unit 302 are copied and attached to the head of the signal array as the cyclic prefix.

The width of the cyclic prefix is determined according to a multi-path channel impulse response and the properties of a time-domain equalization unit 519 at a reception end. If the width of a cyclic prefix is P, the number of parallel time-domain signals output for each symbol by the cyclic prefix insertion unit 303 is N+P.

A time-domain signal array with the cyclic prefix added thereto is converted into a serial signal array by a parallel-to-serial conversion unit 304.

An output waveform distribution of a signal array which is outputted by the parallel-to-serial conversion unit 304 can be modelled as Gaussian process according to the central limit theorem under the conditions that a plurality of binary transmission signals input to the modulation apparatus illustrated in FIG. 3 are independent from one another and random.

In other words, an output signal array of the parallel-to-serial conversion unit 304 has a noise-like waveform with an average of zero. Also, the dispersion of output waveforms (i.e., an alternating current power) of the output signal array of the parallel-to-serial conversion unit 304 is proportional to the number of signals input to and/or output from the N-point inverse Fourier transform unit 302, i.e., N.

Therefore, a typical OFDM signal array using a plurality of sub-carriers has a very high peak-to-average power ratio (PAPR) and a bipolar waveform.

Conventionally, in order to intensity-modulate a bipolar OFDM signal array having a high PAPR, a DC bias, which is equal to the inverse of a minimum peak of the bipolar OFDM signal array, is applied, thereby unipolarizing the bipolar OFDM signal array such that the bipolar OFDM signal can be readily intensity-modulated.

However, this type of IM method generally results in very low transmission power efficiency.

According to the current embodiment of the present invention, the apparatus 330 is characterized by converting a bipolar OFDM time-domain signal array into a unipolar OFDM time-domain signal array without the aid of a DC bias.

Figure 4A:
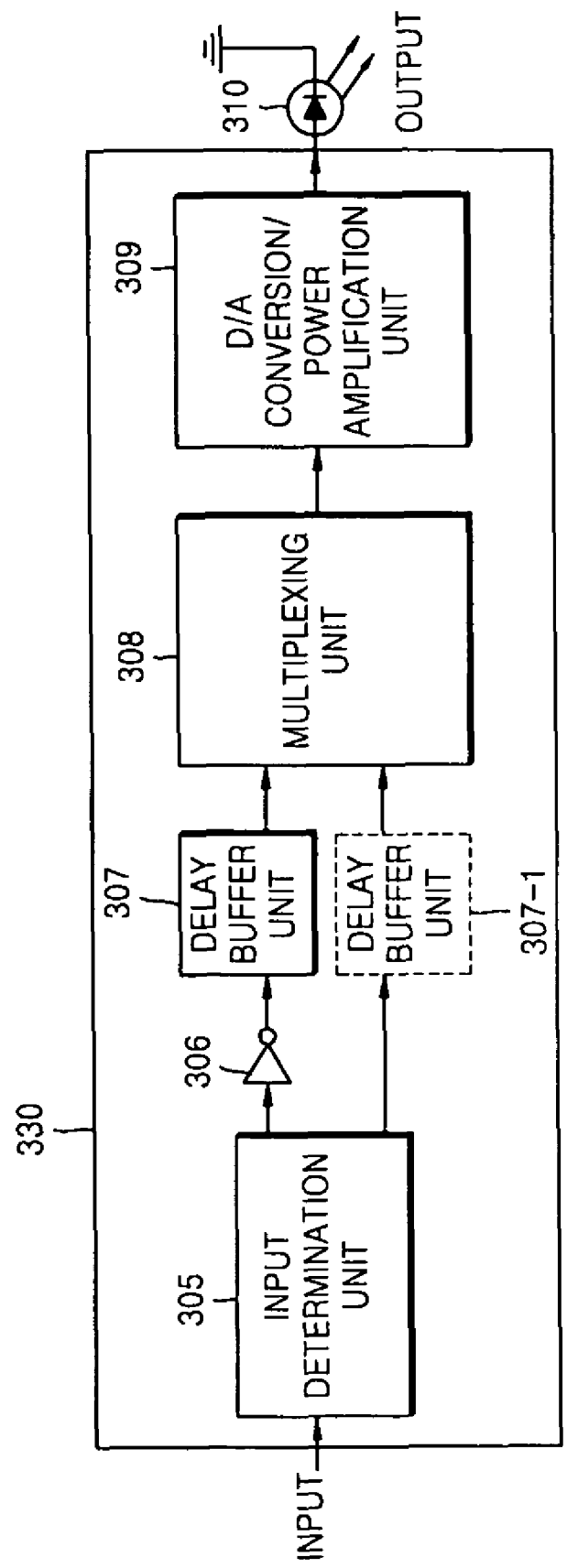
FIG. 4A is a block diagram of an apparatus for converting a bipolar OFDM symbol frame into a unipolar OFDM symbol frame of the modulation apparatus of FIG. 3.

FIG. 4A is a block diagram of the apparatus 330 illustrated in FIG. 3 according to an exemplary embodiment of the present invention. Referring to FIG. 4A, the apparatus 330 includes an input determination unit 305 which determines the polarity of each pulse on a bipolar OFDM symbol frame and generates positive sub-frame and negative sub-frame according to the determined polarity. The input determination unit 305 outputs negative sub-frames to the polarity inverter 306, which converts negative pulses into positive pulses.

The delay buffer unit 307 delays the inverted negative sub-frames. And the position of the delay buffer unit 307 can be moved to the point 307-1, which is indicated in a dotted line, behind the input determination unit 305. If the location of the delay buffer is the point 307-1, the delay buffer unit delays positive sub-frames by a predetermined amount. The predetermined amount, i.e., a delay time D, satisfies Equation (1):

$$D = N + P \quad (1)$$

where N indicates the number of all sub-carriers including pilot sub-carriers and null sub-carriers, and P indicates the width or duration of a cyclic prefix.

The multiplexing unit 308 multiplexes the delayed sub-frame at the unit 307 and the undelayed sub-frame and generates a digital unipolar OFDM symbol frame.

The apparatus 330 also includes a digital-to-analog (D/A) conversion and power amplification unit 309 which converts the digital unipolar OFDM symbol frame into an analog unipolar OFDM symbol frame and amplifies the analog unipolar OFDM symbol frame.

The analog unipolar OFDM symbol frame outputted by the D/A conversion and power amplification unit 309 has only single polarity pulses and a PAPR which is about 3 dB lower than the PAPR of the input bipolar OFDM symbol frame. The analog unipolar OFDM symbol frame can be readily intensity-modulated on a laser/light-emitting diode 310.

FIG. 4B illustrates the values of signal generated in a method of converting a bipolar OFDM symbol frame into a unipolar OFDM symbol frame according to an exemplary embodiment of the present invention.

An operation of the apparatus 330 will now be described in further detail with reference to FIG. 4B assuming that a bipolar OFDM symbol frame that satisfies N=8 and P=2 is inputted to the apparatus 330.

FIG. 4B(i) illustrates a signal array 401 which is a bipolar OFDM symbol frame that satisfies N=8 and P=2 and is inputted to the input determination unit 305. Since the signal array 401 is a bipolar OFDM symbol frame satisfying N=8 and P=2, first and second pulses of the signal array 401 correspond to cyclic prefix sub-frames, and third through tenth pulses of the signal array 401 correspond to data sub-frames. The signal array 401 is bipolar, and thus comprises both positive pulses and negative pulses. In detail, the signal array 401 is comprised of ten pulses respectively having values of −1.0078, −0.7420, 0.6232, 0.7990, 0.9409, −0.9921, 0.2120, 0.2379, −1.0078, and −0.7420.

The input determination unit 305 receives the signal array 401. Thereafter, the input determination unit 305 outputs the positive sub-frame of the signal array 401, i.e., a signal array 402 illustrated in FIG. 4B(ii), to the multiplexing unit 308 and outputs the negative sub-frame of the signal array 401 to the polarity inverter 306.

The polarity inverter 306 inverts the negative sub-frame of the signal array 401 into a positive sub-frame while keeping the original pulse sequence of the negative sub-frame of the signal array 401 intact.

The positive sub-frame obtained through the inversion performed by the polarity inverter 306 is buffered by the delay buffer unit 307.

Comparing the signal array 402 and the signal array 403 with the original signal array 401, it can be seen that pulses included in the signal arrays 402 and 403 respectively correspond to the pulses in the original signal array 401, and that the sequence of the pulses included in the signal arrays 402 and 403 is the same as the sequence of the pulses in the original signal array 401.

In detail, the signal array 402 illustrated in FIG. 4B(ii) is a unipolar signal array comprised of ten pulses respectively having values of 0, 0, 0.6232, 0.7990, 0.9409, 0, 0.2120, 0.2379, 0, and 0, and the signal array 403 illustrated in FIG. 4B(iii) is a unipolar signal array comprised of ten pulses respectively having values of 1.0078, 0.7420, 0, 0, 0, 0.9921, 0, 0, 1.0078, and 0.7420.

The signal array 402 and the signal array 403 are multiplexed into a single array by the multiplexing unit 308.

In detail, the multiplexing unit 308 outputs the entire signal array 402 and then the entire signal array 403. Alternatively, the multiplexing unit 308 may output the entire signal array 403 and then the entire signal array 402.

In an embodiment of the present invention, the result of the multiplexing performed by outputting the entire signal array 402 and then the entire signal array 403 is a signal array 404 illustrated in FIG. 4B(iv).

The signal array 404 is a unipolar signal array comprised of twenty pulses respectively having values of 0, 0, 0.6232, 0.7990, 0.9409, 0, 0.2120, 0.2379, 0, 0, 1.0078, 0.7420, 0, 0, 0, 0.9921, 0, 0, 1.0078, and 0.7420. A unipolar signal array such as the signal array 404 will now be referred to as a unipolar OFDM symbol frame.

The characteristics of a unipolar OFDM symbol frame according to an exemplary embodiment of the present invention which can be readily intensity-modulated will now be described in detail.

Signals (such as X(t) of FIG. 2) must be unipolar to be able to be intensity-modulated. A unipolar OFDM symbol frame according to an exemplary embodiment of the present invention is always unipolar, and thus there is no need for additional equipment such as a device for controlling a DC bias to perform IM.

In the prior art, a signal obtained by directly detecting multi-sub-carrier-modulated light with the aid of a photodetector can be represented by:

$$r\left(b + \sum_{s=0}^{N-1} m x_s \cos(w_s t + \theta_s)\right) \quad (2)$$

where r is a constant determined according to the responsiveness and channel frequency properties of a photodetector, b is a DC bias applied for inducing unipolarity of bipolar OFDM signal in a transmitter, m is a modulation index, $x_s$ and $\theta_s$ are signals transmitted by sub-carriers, and $w_s$ is the radian frequency of the sub-carriers.

When the modulation index m is 1, i.e., 100%, the DC bias b must satisfy Equation (3):

$$b_{min} = \left| \min_{t \subset T_s} \left( \sum_{s=0}^{N-1} x_s \cos(w_s t + \theta_s) \right) \right| \quad (3)$$

where $T_s$ represents the period of an OFDM symbol frame in the time domain to be transmitted.

If transmission power efficiency is defined as the ratio of signal power to overall transmission power, it can be represented, under the conditions that a plurality of signals $x_s(t)$ are independent from one another and that the average of the signals $x_s(t)$ is 0, by Equation (4):

$$\frac{\sum_{s=0}^{N-1} <m^2 x_s^2(t)>}{2b^2 + \sum_{s=0}^{N-1} <m^2 x_s^2(t)>}. \quad (4)$$

The denominator of Equation (4) is the overall transmission power, and the DC bias b in the denominator of Equation (4) is equal to the square of the amplitude of a maximum negative pulse in the signal array.

In the prior art, when the modulation index m is 100%, the signal array 401 illustrated in FIG. 4B(i) has an IM transmission power efficiency of at most 24%. On the other hand, a unipolar OFDM symbol frame according to an exemplary embodiment of the present invention has an IM transmission power efficiency of 100% all the time because it needs a DC bias (b) of 0. Also, the PAPR of a unipolar OFDM symbol frame according to an embodiment of the present invention, which can be obtained by inverting a plurality of negative pulses in a bipolar OFDM symbol frame into a plurality of positive pulses, is about 3 dB lower than the PAPR of the bipolar OFDM symbol frame.

In this regard, it is expected that the operating efficiency of an output power amplifier will be enhanced by 50% and the transmission power efficiency of the output power amplifier will be enhanced by about 400% by using a unipolar OFDM symbol frame according to an exemplary embodiment of the present invention.

Figure 5:
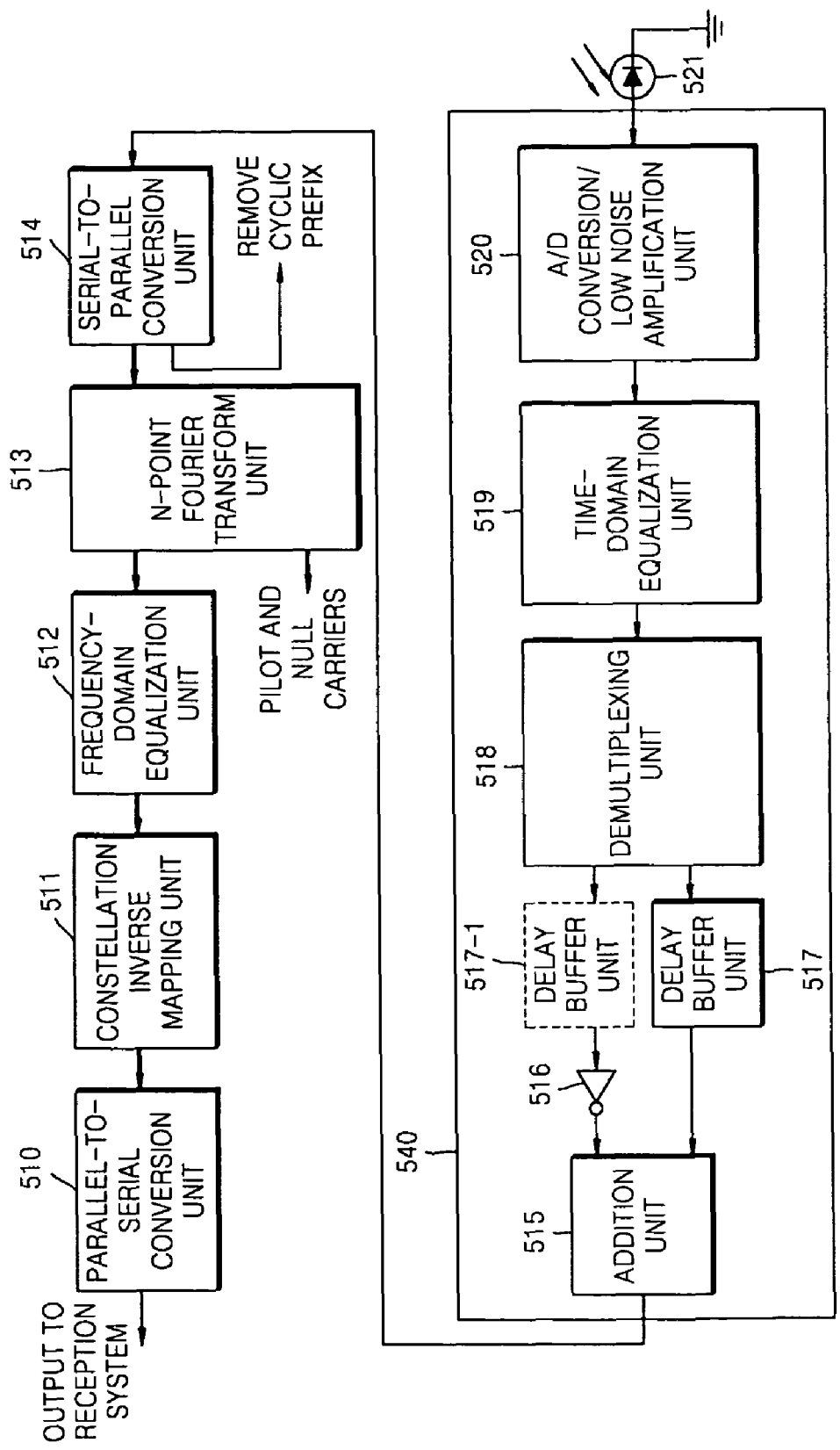
FIG. 5 is a block diagram of a demodulation apparatus including an apparatus for restoring a bipolar OFDM symbol frame from a unipolar OFDM symbol frame according to an exemplary embodiment of the present invention.

FIG. 5 is a block diagram of a demodulation apparatus including an apparatus 540 for restoring a bipolar OFDM symbol frame from a unipolar OFDM symbol frame according to an exemplary embodiment of the present invention. Referring to FIG. 5, a bipolar OFDM symbol frame restored and output by the apparatus 540 is converted into parallel data by a serial-to-parallel conversion unit 514. An example of the bipolar OFDM symbol frame is illustrated as a signal array 604 in FIG. 6B(iv).

The parallel data, a parallel OFDM symbol frame, is converted into a signal array including a plurality of frequency-domain signals by a Fourier transform unit 513. Of the frequency domain-signals, those which correspond to pilot sub-carriers and null sub-carriers are eliminated. Pilot sub-carriers and null sub-carriers are generally used to estimate channels and generate system synchronization signals.

Channel distortion which may be included in a plurality of sub-carrier frequency-domain OFDM signals output by the Fourier transform unit 513 is corrected by a frequency-domain equalization unit 512, and original transmission signals are restored from the results of the correction by a constellation inverse mapping unit 511. Then the original transmission signals obtained through the restoration are converted into serial data by the serial-to-parallel conversion unit 510, and the serial data is output.

Figure 6A:
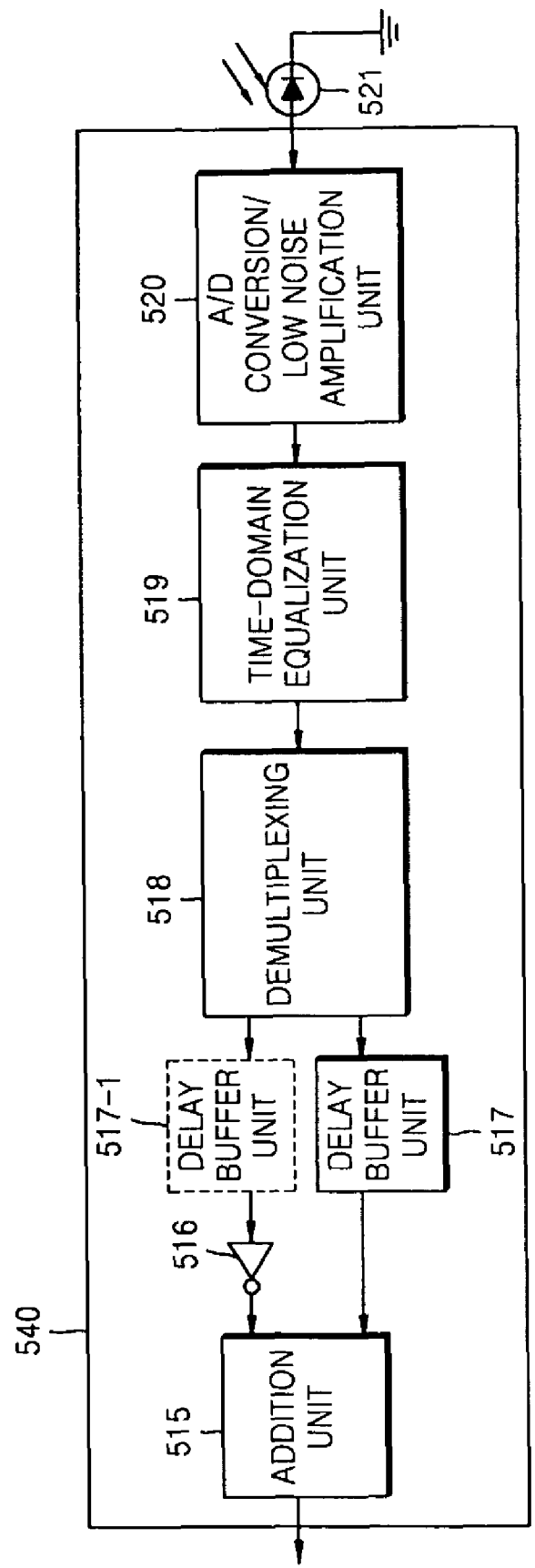
FIG. 6A is a block diagram of an apparatus for restoring a bipolar OFDM symbol frame from a unipolar OFDM symbol frame according to an exemplary embodiment of the present invention.

FIG. 6A is a block diagram of the apparatus 540 illustrated in FIG. 5.

The apparatus 540 restores a bipolar OFDM symbol frame from a unipolar OFDM optical symbol frame transmitted thereto via a channel.

In detail, a photodetector 521 detects an OFDM symbol frame transmitted via a channel. The photodetector 521 may be a PIN photodiode. An analog-to-digital (A/D) conversion/low noise amplification unit 520 amplifies and samples an analog OFDM symbol frame detected by the photodetector 521, thereby obtaining a digital signal array.

A time-domain equalization unit 519 receives a digital unipolar OFDM symbol frame output by the A/D conversion/low noise amplification unit 520 and performs a time-domain equalization function on the digital unipolar OFDM symbol frame.

The time-domain equalization function is a function of reducing a channel impulse response time to less than the duration of a cyclic prefix in order to avoid inter-symbol interference and inter-sub-carrier frequency interference. If the channel impulse response time is shorter than the duration of a cyclic prefix, the time-domain equalization unit 519 may be unnecessary.

A demultiplexing unit 518 demultiplexes the OFDM symbol frame after the time-domain equalization unit 519 reduces the duration of the OFDM symbol frame. The demultiplexing unit 518 performs inverse operations to the operations of the multiplexing unit 308 illustrated in FIG. 3. The demultiplexing unit 518 outputs one half of a unipolar OFDM symbol frame, which is an undelayed frame at producing the unipolar OFDM symbol at a transmitter to a delay buffer unit 517.

The position of the delay buffer is 517-1 when the undelayed frame is the inverted sub-frames at producing the unipolar symbol frames.

The delay buffer unit 517 delays the undelayed sub-frame at producing the unipolar OFDM symbol frame by a predetermined amount. This will be descried later in further detail with reference to FIG. 7.

The predetermined amount corresponds to half the period of the unipolar OFDM symbol frame, $$\frac{T_s}{2}.$$

A polarity restoration unit 516 restores the intrinsic polarity of the sub-frames inverted at generating the unipolar OFDM symbol frame at a transmitter. In detail, the intrinsic negative polarity before inverting at the inverter 306 in the unit 330 is recovered.

The output frame of the polarity restoration unit 516 is inputted to an addition unit 515.

The function of the addition unit 515 is to combine the sub-frame recovered the polarity at the unit 516 and the delayed sub-frame at the unit 517. Accordingly, the original bipolar OFDM symbol frame can be successfully restored from the unipolar OFDM symbol frame if the changes of channel properties are insignificant enough during one symbol duration. The bipolar OFDM symbol frame is outputted to the serial-to-parallel conversion unit 514, which performs serial to parallel conversion on the bipolar OFDM symbol frame. Then an OFDM symbol demodulation operation is performed on the result of the serial-to-parallel conversion performed by the serial-to-parallel conversion unit 514.

FIG. 6B illustrates the values of signal generated in a method of converting a unipolar OFDM symbol frame into a bipolar OFDM symbol frame according to an embodiment of the present invention.

The operation of the apparatus 540 illustrated in FIG. 5 will now be described in detail with reference to FIG. 6, assuming that the unipolar OFDM symbol frame 404 illustrated in FIG. 4B(iv) is inputted to the apparatus 540 via a channel with an impulse response characteristics of 1 and 0.5.

An analog signal array detected by the photodetector 521 is amplified, digitalized, and sampled by the A/D conversion/ low noise amplification unit 520. Then a signal array output by the A/D conversion/low noise amplification unit 520 is inputted to either the time-domain equalization unit 519 or the demultiplexing unit 518 as a signal array 601 illustrated in FIG. 6B(i).

Referring to FIG. 6B(i), the signal array 601 is comprised of a total of 21 unipolar pulses, i.e., first through twenty-first pulses respectively having values of 0, 0, 0.6232, 1.1106, 1.3404, 0.4704, 0.2120, 0.3439, 0.1190, 0, 1.0078, 1.2459, 0.3710, 0, 0, 0.9921, 0.4960, 0, 1.0078, 1.2459, and 0.3710.

Since the channel impulse response time is 2 and the duration of a cyclic prefix is 2, the signal array 601 does not need to be time-domain-equalized by the time-domain equalization unit 519. Thus, in this case, the time-domain equalization unit 519 is unnecessary.

Since the twenty-first pulse having an value of 0.3710 of the signal array 601 corresponds to an increment of the original OFDM symbol frame due to channel distortions, the demultiplexing unit 518 outputs one half of the signal array 601 excluding the twenty-first pulse, i.e., the first through tenth pulses respectively having values of 0, 0, 0.6232, 1.1106, 1.3404, 0.4704, 0.2120, 0.3439, 0.1190, and 0, to an input terminal of the delay buffer unit 517 as a signal array 603 illustrated in FIG. 6B(iii) while keeping the original pulse sequence of the signal array 601 intact. Also, the demultiplexing unit 518 outputs the other half of the signal array 601 excluding the twenty-first pulse, i.e., the eleventh through twentieth pulses respectively having values of 1.0078, 1.2459, 0.3710, 0, 0, 0.9921, 0.4960, 0, 1.0078, and 1.2459, to an input terminal of the polarity restoration unit 516 as a signal array 602 illustrated in FIG. 6B(ii) while keeping the original pulse sequence of the signal array 601.

The polarity restoration unit 516 inverts the polarity of a plurality of pulses included in the signal array 602 and outputs a signal array comprised of ten pulses respectively having values of −1.0078, −1.2459, −0.3710, 0, 0, −0.9921, −0.4960, 0, −1.0078, and −1.2459 to a first input terminal of the addition unit 515 as the result of the inversion. The delay buffer unit 517 delays the signal array 602 input thereto such that a signal array obtained through the delaying can remain in synchronization with the signal array output by the polarity restoration unit 516.

Thereafter, the delay buffer unit 517 outputs the signal array obtained through the delaying to a second input terminal of the addition unit 515. The addition unit 515 restores a bipolar OFDM symbol frame by combining the signal array output by the delay buffer unit 517 and the signal array output by the polarity restoration unit 516. Then the addition unit 515 outputs the bipolar OFDM symbol frame to the serial-to-parallel conversion unit 514.

A signal array 604 illustrated in FIG. 6B(iv) is the bipolar OFDM symbol frame obtained through the restoration by the addition unit 515. The signal array 604 has the same waveform as the waveform obtained by convoluting the bipolar OFDM symbol frame 401 according to the channel impulse responses 1, 0.5 and can be demodulated using a conventional OFDM demodulator.

FIG. 7A is a diagram illustrating the format of a unipolar OFDM symbol frame 700 according to an exemplary embodiment of the present invention, and FIG. 7B is a diagram illustrating the format of a bipolar OFDM symbol frame 705.

Referring to FIG. 7B, the bipolar OFDM symbol frame 705 comprises a positive cyclic prefix sub-frame 706, a negative cyclic prefix sub-frame 708, a positive data sub-frame 707, and a negative data sub-frame 709. The positive cyclic prefix sub-frame 706 is comprised of a plurality of pulses having positive values, and the negative cyclic prefix sub-frame 708 is comprised of a plurality of pulses having negative values.

Likewise, the positive data sub-frame 707 is comprised of a plurality of pulses having positive values, and the negative data sub-frame 709 is comprised of a plurality of pulses having negative values.

Referring to FIG. 7A, the unipolar OFDM symbol frame 700 comprises two sub-frames, i.e., a first sub-frame including a positive cyclic prefix sub-frame 701 and a positive data sub-frame 702; and a second sub-frame including a negative cyclic prefix sub-frame 703 and a negative data sub-frame 704.

The positive cyclic prefix sub-frame 701, the positive data sub-frame 702, the negative cyclic prefix sub-frame 703, and the positive cyclic prefix sub-frame 704 may be arranged in a different order from the one illustrated in FIG. 7A.

The positive cyclic prefix sub-frame 701 of the unipolar OFDM symbol frame 700 can be obtained by reducing the duration of the positive cyclic prefix sub-frame 706 of the bipolar OFDM symbol frame 705 by half while keeping the original pulse sequence of the positive cyclic prefix sub-frame 706 intact. Likewise, the positive data sub-frame 702 of the unipolar OFDM symbol frame 700 can be obtained by reducing the duration of the positive data sub-frame 707 of the bipolar OFDM symbol frame 705 by half while keeping the original pulse sequence of the positive data sub-frame 707 intact.

The negative cyclic prefix sub-frame 703 of the unipolar OFDM symbol frame 700 can be obtained by inverting the polarity of the negative cyclic prefix sub-frame 708 of the bipolar OFDM symbol frame 705 and reducing the duration of a cyclic prefix sub-frame obtained through the inversion by half. Likewise, the negative data sub-frame 704 of the unipolar OFDM symbol frame 700 can be obtained by inverting the polarity of the negative data sub-frame 709 of the bipolar OFDM symbol frame 705 and reducing the duration of a data sub-frame obtained through the inversion by half.

Referring to FIG. 7A, the sum of the durations of the positive cyclic prefix sub-frame 701 and the negative cyclic prefix sub-frame 703 is 2 $T_{cp}$, where $T_{cp}$ is a time period which is equal to or longer than a result of subtracting the sampling interval of a transmission/reception system including the apparatus 540 from the channel impulse response time, which includes the time-domain equalization unit 519.

Referring to FIGS. 7A and 7B, $T_s$ represents the duration of the unipolar OFDM symbol frame 700. The all pulses polarity of a unipolar OFDM symbol frame always remains unipolar, has a PAPR that is 3 dB lower than the PAPR of the bipolar OFDM symbol frame 750, and requires twice as much channel bandwidth as the bipolar OFDM symbol frame 750.

Figure 8:
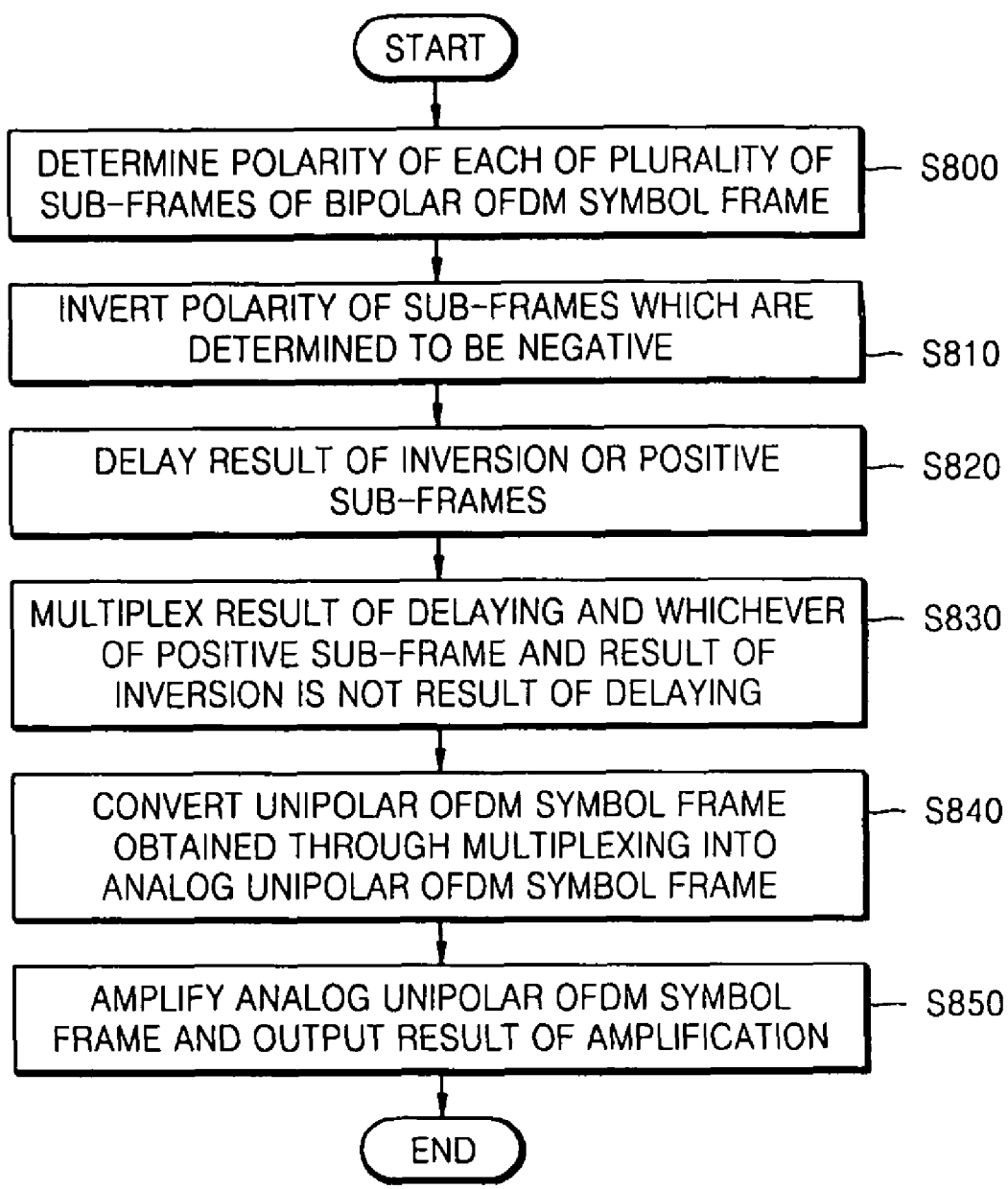
FIG. 8 is a flowchart illustrating a method of converting a bipolar OFDM symbol frame into a unipolar OFDM symbol frame according to an exemplary embodiment of the present invention.

FIG. 8 is a flowchart illustrating a method of converting a bipolar OFDM symbol frame into a unipolar OFDM symbol frame according to an exemplary embodiment of the present invention. Referring to FIG. 8, in operation S800, an input determination unit determines the polarity of a bipolar OFDM symbol frame and divides the bipolar OFDM symbol frame into a positive OFDM sub-frame and a negative OFDM sub-frame according to the results of the determination. In operation S810, a polarity inversion unit inverts the polarity of a plurality of pulses included in the negative OFDM sub-frame.

In operation S820, a delay buffer unit delays either the positive OFDM sub-frame or the OFDM sub-frame obtained through the polarity inversion and outputs the result of the delaying.

In operation S830, a multiplexing unit multiplexes the non-delayed OFDM sub-frame and the delayed OFDM sub-frame to form a unipolar OFDM symbol frame.

In operations S840 and S850, the unipolar OFDM symbol frame is converted into an analog unipolar OFDM symbol frame, the analog unipolar OFDM symbol frame is amplified, and the result of the amplification is output.

Figure 9:
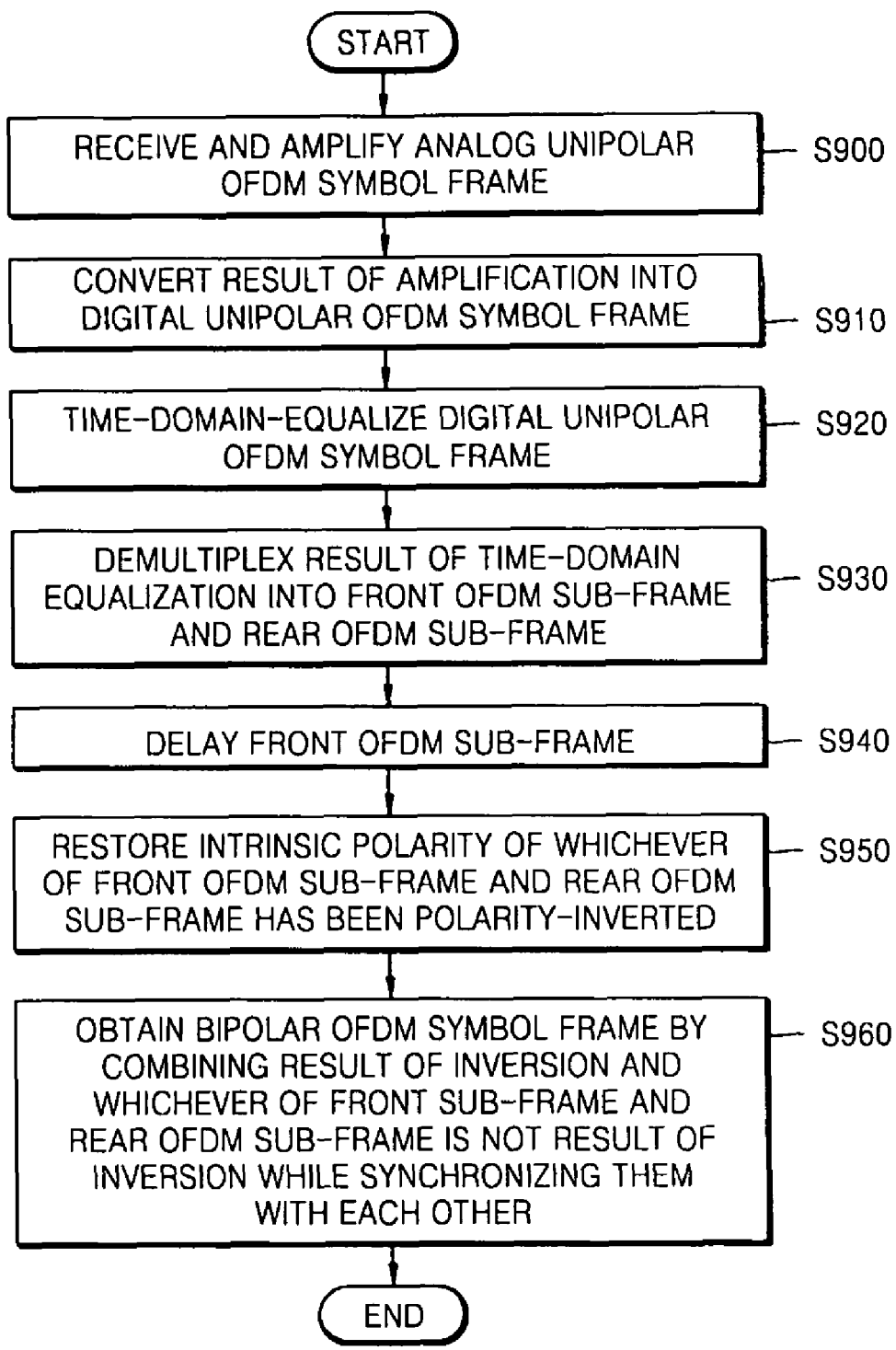
FIG. 9 is a flowchart illustrating a method of restoring a bipolar OFDM symbol frame from a unipolar OFDM symbol frame according to an exemplary embodiment of the present invention.

FIG. 9 is a flowchart illustrating a method of restoring a bipolar OFDM symbol frame from a unipolar OFDM symbol frame according to an exemplary embodiment of the present invention. Referring to FIG. 9, in operation S900, an analog unipolar OFDM symbol frame which comprises a positive sub-frame obtained through polarity inversion and an intrinsically positive sub-frame is received and amplified.

In operation S910, the result of the amplification is converted into a digital unipolar OFDM symbol frame.

In operation S920, the digital unipolar OFDM symbol frame is equalized such that an increment in the duration of the digital unipolar OFDM symbol frame caused by channel distortion remains shorter than the duration of a cyclic prefix sub-frame, i.e., $T_{cp}$.

In operation S930, the result of the equalization is halved and demultiplexed into a front OFDM sub-frame and a rear OFDM sub-frame whose duration is half of the duration of the result of the equalization.

In operation S940, the front OFDM sub-frame is delayed.

In operation S950, the polarity of the pulses included in whichever of the front OFDM sub-frame and the rear OFDM sub-frame has been polarity-inverted during the generation of the analog unipolar OFDM symbol frame is inverted.

In operation S960, a bipolar OFDM symbol frame is obtained by combining the front OFDM sub-frame and the rear OFDM sub-frame while synchronizing them with each other.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, even an MSM system using a considerable number of sub-carriers does not need a block coder, which is difficult to design for proper real-time operation.

In addition, the present invention always generates a baseband modulation waveform which is comprised of a plurality of unipolar signals, and thus does not need a DC bias to intensity-modulate. Accordingly, it is possible to prevent transmission power from being consumed unnecessarily for the purpose of SNR improvement.

The unipolar OFDM symbol frame according to the present invention does not need a DC bias to be intensity-modulated and guarantees a high transmission power efficiency of 100%, whereas a typical bipolar OFDM symbol frame only provides a transmission power efficiency of 24%.

As the number of sub-carriers used in an OFDM-IM/DD method increases, the effect of improving the transmission power efficiency obtained using the unipolar OFDM symbol frame according to the present invention becomes more apparent. In addition, the PAPR of the unipolar OFDM symbol frame according to the present invention is 3 dB lower than the PAPR of a typical bipolar OFDM symbol frame. Thus, according to the present invention, it is possible to enhance the operating efficiency of power amplifiers at an output terminal by 50%.

The modulation apparatus and method and the demodulation apparatus and method according to the present invention can be applied to wireless optical telecommunication systems which cannot easily realize synchronized communication because of difficulty in stabilizing the frequency and phase of sub-carriers; millimeter communication devices using sub-carriers belonging to a high frequency band; and wireless optical communication devices which transmit baseband signals.

Also, the modulation apparatus and method and the demodulation apparatus and method according to the present invention are much robust against a multi-path channel environment as conventional OFDM apparatuses and methods, and thus can be applied even to broadband wired optical communication devices using waveguides having multi-path characteristics such as multi-mode optical fibers or hollow optical waveguides coated with a dielectric material.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A modulation apparatus of a wired/wireless communication system comprising:
    an input determinator which determines the polarity of each of a plurality of sub-frames of a bipolar orthogonal frequency division modulation (OFDM) symbol frame, the sub-frames comprising a positive sub-frame and a negative sub-frame;
    a polarity inverter which inverts the negative sub-frame of the bipolar OFDM symbol frame into a positive sub-frame;
    a delay buffer which delays one of the positive sub-frame obtained by the polarity inversion unit and the positive sub-flame obtained by the bipolar OFDM symbol frame;
    a multiplexer which multiplexes the delayed OFDM sub-frame and the undelayed OFDM sub-frame;
    a digital-to-analog (D/A) converter which converts an OFDM symbol frame obtained through the multiplexing into an analog OFDM symbol frame; and
    a power amplifier which amplifies the analog OFDM symbol frame.

2. The modulation apparatus of claim 1, wherein the delay buffer delays the inverted sub-frame by the polarity inverter.

3. A modulation method of a wired/wireless communication system comprising:
   determining the polarity of each of a plurality of sub-frames of a bipolar orthogonal frequency division modulation (OFDM) symbol frame, the sub-frames comprising a positive sub-frame and a negative sub-frame;
   inverting the negative sub-frame of the bipolar OFDM symbol frame into a positive sub-frame;
   delaying one of the positive sub-flame obtained through the inversion and the positive sub-frame obtained through the bipolar OFDM symbol frame;
   multiplexing the delayed OFDM sub-frame and the undelayed OFDM sub-frame;
   converting an OFDM symbol frame obtained through the multiplexing into an analog OFDM symbol frame; and
   amplifying the analog OFDM symbol frame.

4. The modulation method of claim 3, wherein the delaying comprises delaying the positive sub-frame obtained through the inversion.

5. A demodulation apparatus of a wired/wireless communication system comprising:
   a low noise amplifier which receives and amplifies an analog unipolar orthogonal frequency division modulation (OFDM) symbol frame comprising a positive sub-frame obtained through polarity inversion and an intrinsically positive sub-frame;
   an analog-to-digital converter which converts the result of the amplification into a digital unipolar OFDM symbol frame;
   a time-domain equalizer which equalizes the unipolar OFDM symbol frame;
   a demultiplexer which demultiplexes the time-domain-equalized unipolar OFDM symbol frame into a front OFDM sub-frame and a rear OFDM sub-frame, the duration of the front OFDM sub-frame and the duration of the rear OFDM sub-frame each being half of the duration of the equalized unipolar OFDM symbol frame;
   a delay buffer which delays the front OFDM sub-frame by half of the duration of the time-domain-equalized unipolar OFDM symbol frame;
   a polarity restorator which restores the intrinsic polarity of whichever of the front OFDM sub-frame and the rear OFDM sub-frame has been polarity-inverted; and
   an adder which combines the result of the restoration and whichever of the front OFDM sub-frame and the rear OFDM sub-frame has not been restored in synchronization with each other.

6. The demodulation apparatus of claim 5, wherein the delay buffer delays whichever of the front orthogonal frequency division modulation (OFDM) sub-frame and the rear OFDM sub-frame has not been polarity-inverted.

7. A demodulation method of a wired/wireless communication system comprising:
   receiving and amplifying an analog unipolar orthogonal frequency division modulation (OFDM) symbol frame comprising a positive sub-frame obtained through polarity inversion and an intrinsically positive sub-frame;
   converting the result of the amplification into a digital unipolar OFDM symbol frame;
   time-domain-equalizing the digital unipolar OFDM symbol frame;
   demultiplexing the time-domain-equalized digital unipolar OFDM symbol frame into a front OFDM sub-frame and a rear OFDM sub-frame, the duration of the front OFDM sub-frame and the rear OFDM sub-frame each being half of the duration of the equalized unipolar OFDM symbol frame;
   delaying the front OFDM sub-frame by half of the duration of the time-domain-equalized digital unipolar OFDM symbol flame;
   restoring the intrinsic polarity of whichever of the front OFDM sub-frame and the rear OFDM sub-frame has been polarity inverted; and
   combining the result of the restoration and whichever of the front OFDM sub-frame and the rear OFDM sub-flame has not been restored while synchronizing them with each other.

8. The demodulation method of claim 7, wherein the delaying comprises delaying whichever of the front orthogonal frequency division modulation (OFDM) sub-frame and the rear OFDM sub-frame has not been polarity-inverted.

9. The modulation apparatus of claim 1, further comprising:
   a serial-to-parallel converter for performing serial to parallel conversion on an input signal;
   a constellation mapper for performing constellation mapping on the input signal on which serial to parallel conversion is performed;
   an inverse Fourier transformer for transforming the input signal of a frequency domain on which constellation mapping is performed into a signal of a time domain through an inverse Fourier transform;
   a cyclic prefix inserter for inserting a cyclic prefix into the signal of the time domain; and
   a parallel-to-serial converter for performing parallel to serial conversion on the signal of the time domain into which the cyclic prefix is inserted and outputting a bipolar OFDM symbol frame.

10. The modulation method of claim 3, further comprising:
    before the determining of the polarity, performing serial to parallel conversion on an input signal;
    performing constellation mapping on the input signal on which serial to parallel conversion is performed;
    transforming the input signal of a frequency domain on which constellation mapping is performed into a signal of a time domain through an inverse Fourier transform;
    inserting a cyclic prefix into the signal of the time domain; and
    performing parallel to serial conversion on the signal of the time domain into which the cyclic prefix is inserted and outputting a bipolar OFDM symbol frame.

11. The demodulation apparatus of claim 5, further comprising:
    a serial-to-parallel converter for performing serial to parallel conversion on an output frame of the addition unit;
    a Fourier transformer for performing Fourier transform on the output frame on which serial to parallel conversion is performed and generating a sub-carrier OFDM signal of a frequency domain;
    a frequency domain equalizer for correcting a channel distortion of the sub-carrier OFDM signal;
    a constellation inverse mapper for modulating the sub-carrier OFDM signal and restoring an original transmission signal; and
    a parallel-to-serial converter for performing parallel to serial conversion on the original transmission signal.

12. The demodulation method of claim 7, further comprising:
    performing serial to parallel conversion on an output frame of the addition unit;
    performing Fourier transform on the output frame on which serial to parallel conversion is performed and generating a sub-carrier OFDM signal of a frequency domain;
    correcting a channel distortion of the sub-carrier OFDM signal;
    modulating the sub-carrier OFDM signal and restoring an original transmission signal; and
    performing parallel to serial conversion on the original transmission signal.

* * * * *